(12) United States Patent
Frank et al.

(10) Patent No.: US 8,532,141 B2
(45) Date of Patent: *Sep. 10, 2013

(54) METHOD AND SYSTEM FOR PROVIDING BANDWIDTH ALLOCATION AND SHARING IN A HYBRID WIRED/WIRELESS NETWORK

(75) Inventors: Ed H. Frank, Atherton, CA (US); Richard Martin, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 13/027,548

(22) Filed: Feb. 15, 2011

(65) Prior Publication Data

US 2011/0134866 A1    Jun. 9, 2011

Related U.S. Application Data

(63) Continuation of application No. 10/658,578, filed on Sep. 9, 2003, now Pat. No. 7,889,761.

(60) Provisional application No. 60/411,261, filed on Sep. 17, 2002, provisional application No. 60/411,301, filed on Sep. 17, 2002, provisional application No. 60/433,044, filed on Dec. 13, 2002, provisional application No. 60/435,984, filed on Dec. 20, 2002.

(51) Int. Cl.
*H04J 3/16* (2006.01)

(52) U.S. Cl.
USPC .......................................... 370/468; 370/235

(58) Field of Classification Search
USPC .............................................. 370/235, 468
See application file for complete search history.

(56) References Cited

U.S. PATENT DOCUMENTS

| | | | |
|---|---|---|---|
| 5,241,632 A | | 8/1993 | O'Connell et al. |
| 5,367,523 A | * | 11/1994 | Chang et al. ................... 370/235 |
| 5,894,471 A | | 4/1999 | Miyagi et al. |
| 6,108,314 A | | 8/2000 | Jones et al. |
| 6,118,791 A | * | 9/2000 | Fichou et al. ................. 370/468 |
| 6,262,974 B1 | | 7/2001 | Chevalier et al. |
| 6,483,835 B1 | | 11/2002 | Tanigawa et al. |
| 6,560,231 B1 | | 5/2003 | Kawakami et al. |
| 6,603,775 B1 | | 8/2003 | Chahrouri |
| 6,717,948 B1 | | 4/2004 | Subbiah |
| 6,738,816 B1 | * | 5/2004 | Momona ....................... 709/226 |
| 6,771,661 B1 | * | 8/2004 | Chawla et al. ................ 370/468 |
| 6,839,767 B1 | | 1/2005 | Davies et al. |
| 7,197,244 B2 | * | 3/2007 | Thomas et al. ................. 398/72 |
| 7,260,638 B2 | | 8/2007 | Crosbie |
| 7,266,683 B1 | * | 9/2007 | Nag ............................. 713/154 |
| 2002/0093983 A1 | | 7/2002 | Newberg et al. |
| 2002/0095400 A1 | | 7/2002 | Johnson |
| 2002/0101826 A1 | | 8/2002 | Giacopelli et al. |
| 2003/0016630 A1 | | 1/2003 | Vega-Garcia et al. |
| 2003/0039206 A1 | | 2/2003 | Dang et al. |
| 2004/0044770 A1 | | 3/2004 | Messick et al. |

* cited by examiner

*Primary Examiner* — Phuc Tran
(74) *Attorney, Agent, or Firm* — Thomas | Horstemeyer, LLP

(57) ABSTRACT

A method for managing resources in a hybrid wired/wireless local area network (LAN) includes reserving bandwidth for a network device. The reserving of the bandwidth is based, at least in part, on a device hierarchy established within the hybrid LAN. The hierarchy is utilized for one or more of bandwidth reservation, bandwidth sharing, and/or bandwidth allocation within the hybrid LAN. In response to a communication session associated with the network device, at least a portion of the reserved bandwidth may be allocated for use by the network device. The at least a portion of the reserved bandwidth may be used during the communication session. A request for bandwidth may be received by one or both of the network device and/or a second network device.

45 Claims, 9 Drawing Sheets

METHOD AND SYSTEM FOR PROVIDING BANDWIDTH ALLOCATION AND SHARING IN A HYBRID WIRED/WIRELESS NETWORK

CROSS-REFERENCE TO RELATED APPLICATIONS/INCORPORATION BY REFERENCE

This application is a continuation of application Ser. No. 10/658,578 filed Sep. 9, 2003, which in turn makes reference to, claims priority to and claims the benefit of:

U.S. Provisional Patent Application Ser. No. 60/433,044 entitled "Method and System for Providing Bandwidth Allocation and Sharing in a Hybrid Wired/Wireless Network" filed on Dec. 13, 2002;

U.S. Provisional Patent Application Ser. No. 60/411,261 entitled "Communications Systems Software and Protocols" filed on Sep. 17, 2002;

U.S. Provisional Patent Application Ser. No. 60/411,301 entitled "Method and System for Providing a Scalable Integrated Switch and Wireless Architecture" filed on Sep. 17, 2002; and U.S. Provisional Application Ser. No. 60/435,984 entitled "Communication System and Method in a Wireless Local Area Network" filed on Dec. 20, 2002.

FIELD OF THE INVENTION

Embodiments of the present application relate generally to hybrid wired/wireless networking, and more particularly to a method and system for bandwidth allocation and sharing in a hybrid wired/wireless network.

BACKGROUND OF THE INVENTION

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108, layer 3, a network layer 106; layer 2: a data link layer 104; and layer 1, a physical layer 102. The physical layer 102 may further include a physical layer convergence procedure (PLOP) sublayer 102b and a physical media dependent sublayer 102a. The data link layer 104 may also include a Medium access control (MAC) layer 104a.

In general, each OSI layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLOP layer 102b may be configured to adapt and map services provided by the physical layer 102 to the functions provided by the device specific PMD sublayer 102a. Specifically, the PLOP layer 102b may be adapted to map PHY sublayer service data units (PDSUs) into a suitable packet and/or framing format necessary for providing communication services between two or more entities communicating via the physical medium. The PMD layer 102a specifies the actual methodology and/or protocols which may be used for receiving and transmitting via the physical medium. The MAC sublayer 104a may be adapted to provide, for example, any necessary drivers which may be utilized to access the functions and services provided by the PLOP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 801.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSSS), infrared (IR) communication, high rate direct sequence spread spectrum spread spectrum (HR-DSS) and orthogonal frequency division multiplexing (OFDM). The 802.11 standard also provides a PLOP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are a number of standards in the suite of specifications, namely 802.11b, 802.11a and 802.11g which have been adapted to facilitate the demands for increased data rates. The 802.11g standard for example, provides a maximum data rate of about 54 Mbps at a transmitter/receiver range of 19 meters (m) in a frequency range of 2.4 GHz to 2.4835 GHz. The 802.11b standard for example, provides a maximum data rate of about 11 Mbps at a transmitter/receiver range of 57 meters (m) in a frequency range of 2.4 GHz to 2.4835 GHz. Finally, the 802.11a standard for example, may be adapted to provide a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA).

CSMA/CA utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at a subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, a CSMA/OA or ready to send (RTS) and clear to send (CTS) messaging scheme may be employed, for example. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes one of two modulation formats including direct sequence spread spectrum (DSS) using differential binary phase shift keying and frequency hopping spread spectrum (11-bit Barker sequence), 802.11b utilizes a higher data rate form of DSS called complementary code keying (CCK). CCK permits higher data rate and particularly less susceptible to interference effects such as multipath-propagation interference, the PSK.

802.11a utilizes orthogonal frequency-division multiplexing (OFDM) modulation/encoding scheme, which provides a maximum data rate 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11b compliant access point.

Furthermore although 802.11g compatible equipment operates in the 2.4 GHz to 2.4835 GHz frequency range, a typical transmitted signal utilizes a bandwidth of approximately 22 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b and 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11b and 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a causes more attenuation resulting in a shorter operating range at a given data rate. This may significantly increase deployment cost since a larger number of access points are required to service a given service area.

In hybrid wired/wireless network systems that may utilize one or more protocols in the 802.11 suite of protocols, the mobility of access devices throughout the network may pose additional challenges for conventional switches and switching equipment. Since access devices are continuously changing their point of access to the network, conventional switches may not have the capability to control other network devices and/or entities to provide seamless communication throughout the network. Allocation and de-allocation of certain network resources can be challenging in a network in which the traffic dynamics are continuously changing. Moreover, particularly in network systems that may handle large volumes of access device traffic, conventional switching and signaling may consume significant amounts of system resources and this may reduce the amount of available system resources, thereby effectively reducing system throughput and performance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a method and system for bandwidth allocation and sharing in a hybrid wired/wireless network. The method for bandwidth allocation and sharing in a hybrid wired/wireless local area network may include reserving bandwidth for a first access device, a first access point and/or a first switch. In response to a communication session associated with one or more of the first access device, first access point and first switch, at least a portion of the reserved bandwidth may be allocated for use by the first access device, first access point and/or first switch. At least a portion of the reserved bandwidth may be utilized during the communication session. At least an unused remaining portion of the reserved bandwidth may be utilized for communication by one or more of a second access device, a second access point and a second switch.

The first and/or second access points may receive a request for bandwidth from the first and/or second access devices. Similarly, the first and/or second switches may receive a request for bandwidth from the first and/or second access points. At least a portion of the reserved bandwidth and an unused remaining portion of the reserved bandwidth may be allocated upon initiation of the communication session and/or during the communication session. The reservation of bandwidth may be based on a device type or a priority assigned to an access devices. Accordingly, an access device's device type and/or priority may be identified prior to reservation of the bandwidth.

Bandwidth information associated with first and second access devices, first and second access points, and first and second switches may be received from any one or more of a bandwidth management process, a quality of service management process, a load balancing management process, a session control process, and a network management process using, for example, a messaging protocol message. The received bandwidth information may be utilized for bandwidth allocation and sharing.

Another embodiment of the invention may provide a machine-readable storage, having stored thereon a computer program having at least one code section for providing bandwidth allocation and sharing in a hybrid wired/wireless local area network, the at least one code section being executable by a machine for causing the machine to perform the steps described above.

A system for bandwidth allocation and sharing in a hybrid wired/wireless local area network may include at least one processor that may be adapted to reserve bandwidth for a first access device, a first access point and/or a first switch. In response to a communication session associated with one or more of the first access device, first access point and first switch, the processor may allocate at least a portion of the reserved bandwidth for use by the first access device, first access point and/or first switch. The processor may utilize the reserved bandwidth during the communication session. At least an unused remaining portion of the reserved bandwidth may be utilized by the processor for communication by one or more of a second access device, a second access point and a second switch.

The processor may be adapted to reserve the bandwidth based on a device type and/or priority associated with a particular access device. Prior to reservation of the bandwidth, the processor may identify the device type and/or priority of an access device. The processor may be adapted to receive bandwidth information associated with the first and second access devices, the first and second access point, and/or the first and second switches from one or more of a bandwidth management process, a quality of service management process, a load balancing management process, a session control process, and a network management process using, for example, a messaging protocol message. The processor may utilize the received bandwidth information for bandwidth allocation and sharing. The processor may be one or more of a control processor, a bandwidth management controller, a quality of service controller, a load balancing controller, a session controller and a network management controller.

These and other advantages, aspects and novel features of the present invention, as well as details of an illustrated embodiment thereof, will be more fully understood from the following description and drawings.

DETAILED DESCRIPTION OF THE INVENTION

Aspects of the invention provide a method and system for bandwidth allocation and sharing in a hybrid wired/wireless network. The method for bandwidth allocation and sharing in a hybrid wired/wireless local area network may include reserving bandwidth for a first access device, a first access point and/or a first switch. In response to a communication session associated with one or more of the first access device, first access point and first switch, at least a portion of the reserved bandwidth may be allocated for use by the first access device, first access point and/or first switch. At least a portion of the reserved bandwidth may be utilized during the communication session. At least an unused remaining portion of the reserved bandwidth may be utilized for communication by one or more of a second access device, a second access point and a second switch.

Figure 1A:
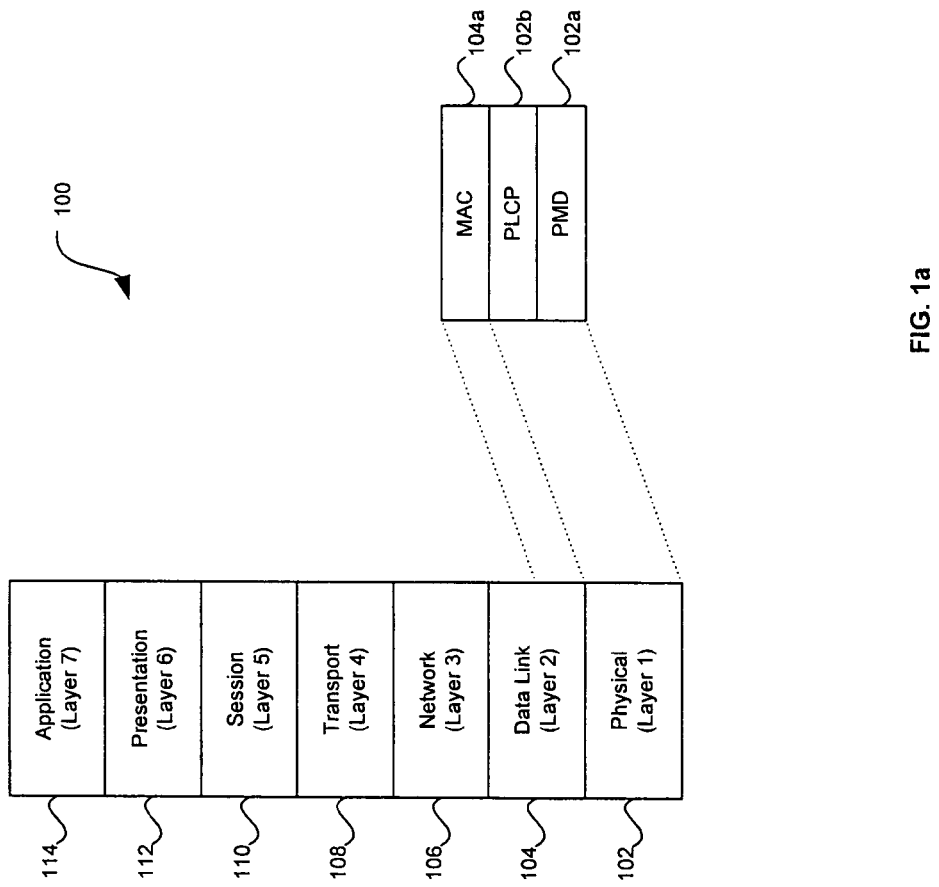
FIG. 1a is a block diagram of the OSI model.
Figure 1B:
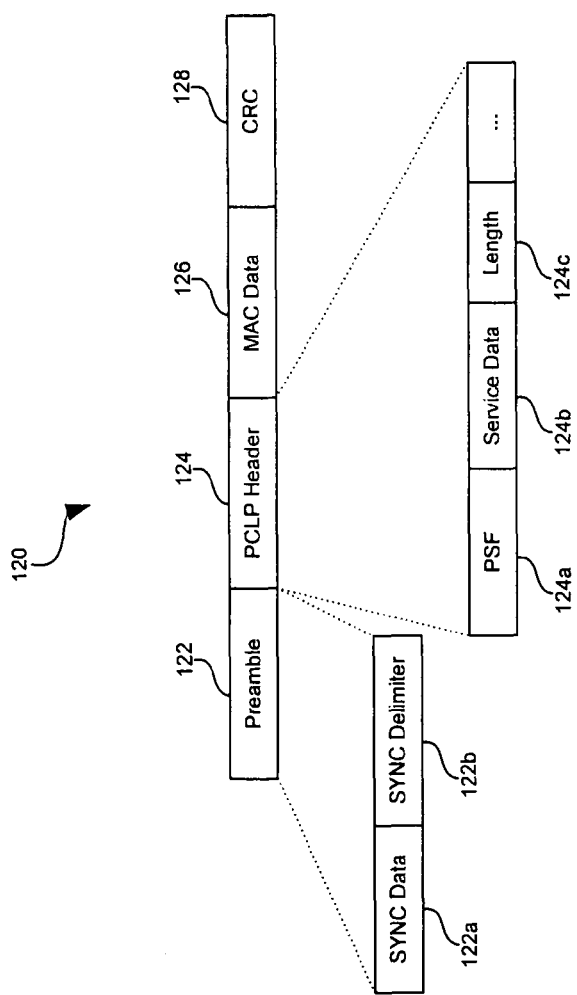
FIG. 1b is a block diagram illustrating a general PLOP frame as defined by 802.11.

FIG. 1b is a block diagram 120 illustrating a general PLOP frame as defined by 802.11. Referring to FIG. 1b, there is shown preamble 122, PLOP header 124, MAC data 126, and CRC 128. Preamble 122 may include synchronization (SYNC) data 122a and synchronization delimiter 122b. The PLOP header 124 may include, for example PLOP signal field (PSF) 124a, service data 124b, length 124c and other fields. The preamble 122 may be dependent on the PHY. The SYNC data 122a may include a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLOP header 124 may be adapted to contain information used for decoding the frame. For example, the PSF 124a may be adapted to include communication data rate information. The service data 124b is generally reserved, but may be utilized to provide application specific functionality. The length 124c may be adapted to indicate the length of the MAC data 126. In this regard, the length 124c may be expressed in terms of the time required to transmit the MAC data 126.

Figure 1C:
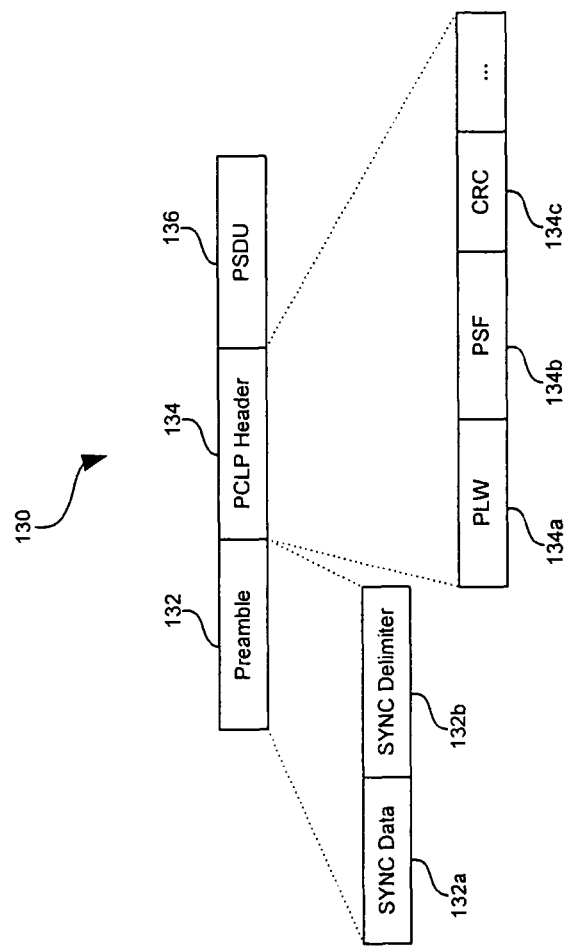
FIG. 1c is a block diagram illustrating a PLOP frame utilized by frequency hopping spread spectrum as defined by 802.11.

FIG. 1c is a block diagram 130 illustrating a PLOP frame utilized by frequency hopping spread spectrum as defined by 802.11. Referring to FIG. 1c, there is shown a SYNC data 132, PLOP header 134 and PSDU 136. The PLOP header 134 may include, for example, PSDU length word (PLW) 134a, PLOP signaling field (PSF) 134b, header error check field or CRC 134c and other fields. The PLW 134a may specify the number of octets contained in the PSDU 136. The PSF 134 be may be 4-bits in length and may be used to denote the communication data rate.

Figure 1D:
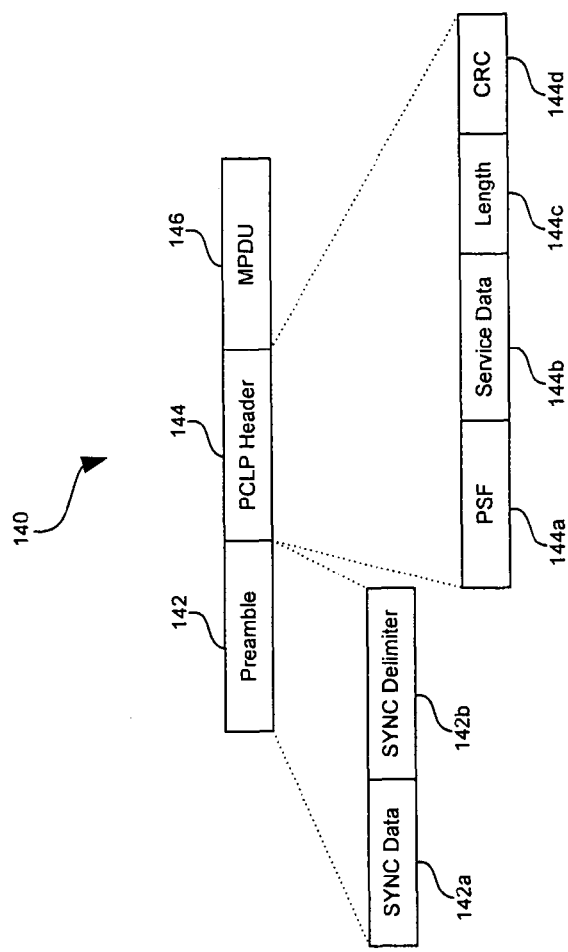
FIG. 1d is a block diagram illustrating a PLOP frame for direct sequence spread spectrum and high rate direct sequence spread spectrum as defined by 802.11.

FIG. 1d is a block diagram 140 illustrating a PLOP frame for direct sequence spread spectrum and high rate direct sequence spread spectrum (HR-DSS) as defined by 802.11. Referring to FIG. 1d, there is shown preamble 142, PLOP header 144 and MPDU 146. Preamble 142 may include synchronization (SYNC) data 142a and synchronization delimiter 142b. The PLOP header 144 may include PLOP signal field (PSF) 144a, service data 144b, length 144c, and CRC field 144d. The SYNC data 142a may be 128 bits as compared to 8 bits for SYNC data 132a for frequency hopping spread spectrum. The CRC 144d is 16 bits, which is similar to CRC 134c for frequency hopping spread spectrum.

Figure 1E:
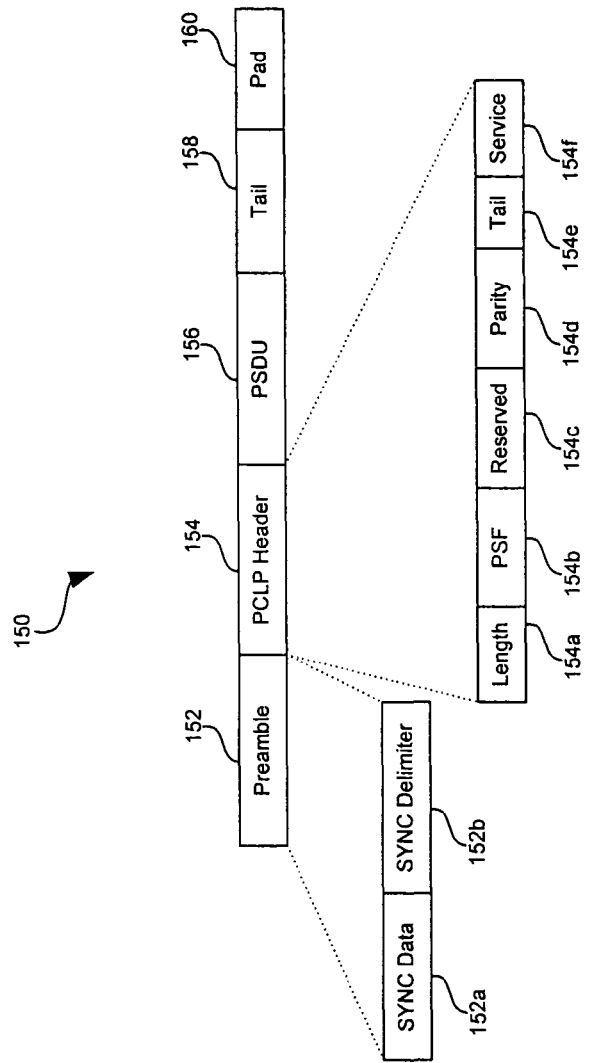
FIG. 1e is a block diagram illustrating a PLOP frame for orthogonal frequency division multiplexing as defined by 802.11.

FIG. 1e is a block diagram 150 illustrating a PLOP frame for orthogonal frequency division multiplexing as defined by 802.11. Referring to FIG. 1e, there is shown preamble 152, PLOP header 154 and PSDU 156, tail 158 and pad 160. Preamble 152 may include synchronization (SYNC) data 152a and synchronization delimiter 152b. The PLOP header 154 may include length 154a, PLOP signal field (PSF) 154b, reserved field 154c, parity 154d, tail 154e and service 154f. The length 154a is a 12-bit field that may be adapted to indicate the length of the frame. The PSF 154b is a 4-bit field that may indicate a modulation scheme utilized and its associated coding rate of the PSDU. For example, the specification utilizes binary 1011 to represent 6 Mbps, 1111 to represent 9 Mbps, 1010 to represent 12 Mbps, 1110 to represent 18 Mbps, 1001 to represent 24 Mbps, 1011 to represent 36 Mbps, 1000 to represent 48 Mbps and finally, 1100 to represent the maximum standardized rate if 54 Mbps. The reserved field 154c is a 1 bit field that is reserved for future use and may be adapted for application specific use. The parity field 154d may indicate odd or even parity. The tail field 154e is a 6-bit field. The service field 154f is a 16-bit field that may be adapted to indicate the type of service.

In a typical hybrid wired/wireless network, especially as access devices become mobile throughout the network, channel capacity may vary rapidly with time. For example, when the distance from an access device to an access point increases or decreases due to mobility, the channel capacity and ultimately the channel throughput may change with time. Accordingly, as channel capacity increases, so does interference and noise generated by other access devices and/or neighboring access points. Currently, some systems provide bandwidth management by providing channel and noise avoidance mechanisms. However, these channel and noise avoidance mechanisms are adapted to minimize the effects of interference and noise after the interference and noise occurs. In accordance with an embodiment of the invention, a method and system is provided for bandwidth allocation and sharing prior to detection and occurrence of the noise and interference. In this regard, the invention provides an proactive approach to the bandwidth management. Bandwidth management may include, but is not limited to, policing, tracking bandwidth usage, and adapting bandwidth allocation to meet user demands and system capability to ensure optimal bandwidth sharing.

In an embodiment of the invention, a bandwidth sharing or etiquette scheme may be provided for use, for example, in a multi-band multi-protocol network which may utilize a plurality of radios. The invention may be particularly beneficial in such an environment since the plurality of radios or transceiver devices may operate, for example, in different frequency bands and may generate interference and may be also subjected to interference. The transceiver devices may include, but are not limited to, access devices and/or access points.

In accordance with another embodiment of the invention, bandwidth reservations may be made, for example, in a contentious environment via an access point or a switch. Although the bandwidth reservations may be predefined, the invention is not so limited. Accordingly, the bandwidth reservation may be dynamically made. Notwithstanding, a set of predefined rules may be established to reserve bandwidth based on an established criteria. Although the rules may be predefined, based on existing channel conditions, the rules may be dynamically modified to provide optimal bandwidth allocation, sharing and usage while communications sessions may be in progress. For example, although bandwidth may be reserved and allocated for a particular entity, if the reserved bandwidth is not being utilized, then the rules may be dynamically changed to permit usage by another entity.

Channel etiquette or usage in unlicensed frequency bands may range from polite to impolite. For example, channel usage by 801.11 compatible devices may be deemed polite while channel usage by, for example, a microwave which expends energy across all relevant bands, may be deemed impolite. On the other hand, the use of a Bluetooth compatible device may be deemed somewhat impolite since a Bluetooth compatible device may have the capability of channel hopping, thereby providing potential interference in a plurality of frequency bands. Accordingly, aspects of the invention provide a common mechanism which may be adapted to permit co-existence and sharing of a plurality of diverse types of radios on a particular channel or frequency band.

In accordance with an embodiment of the invention, an access device may be adapted to register its bandwidth requirements and needs with a serving access point upon initiation of communication. However, the invention is not limited in this regard, and a access device may be permitted to change its bandwidth requirements during a communication session. In one aspect of the invention, an access device or client may be adapted to dynamically request changes to its bandwidth reservation and bandwidth requirements during an active communication session. For example, if during a plain text session there is a need to send audio and/or video data, additional bandwidth may be requested. Accordingly, the access device may register a request for additional bandwidth or request reservation of additional bandwidth to facilitate its communication needs.

Although the reservation may occur during initiation of a communication session, it may occur during a communication under changed circumstances. An access point may be adapted to register bandwidth requirements and needs with a switch upon initiation of a communication session. For example, as traffic density within a coverage area of an access point increases, the access point may request and/or reserve additional bandwidth to accommodate the increased traffic. Additionally, a switch or access point in a first network domain may register its bandwidth requirements and needs with access points and/or other switches in a second network domain.

Figure 2:
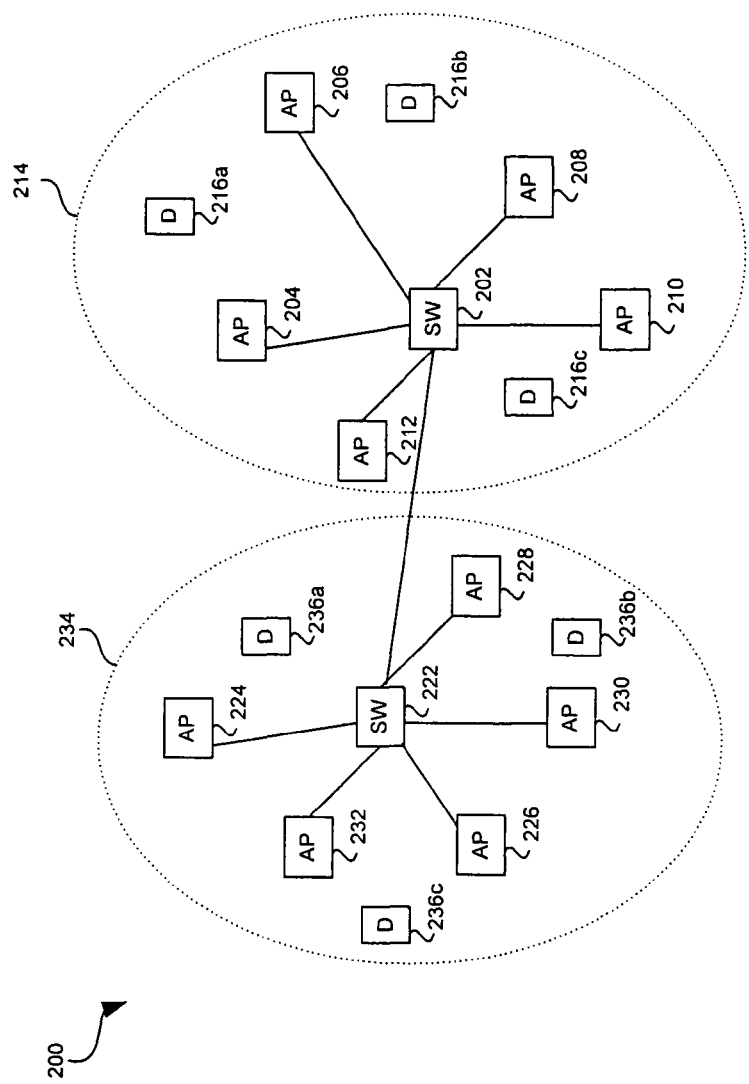
FIG. 2 is a block diagram of an exemplary system having an intelligent switch for bandwidth management in a hybrid wired/wireless network in accordance with an embodiment of the invention.

FIG. 2 is a block diagram of an exemplary system for network management in a wireless local area network in accordance with an embodiment of the invention. Referring to FIG. 2, there is illustrated a first networking domain 214 and a second networking domain 234. The first networking domain 214 may include a switch 202, and access points 204, 206, 208, 210, 212. Each of access points 204, 206, 208, 210, 212 may be coupled to the switch 202. The second networking domain 234 may include a switch 222, and access points 224, 226, 228, 230, 232. Each of access points 224, 226, 208, 230, 232 may be coupled to the switch 222. Switch 222 may be coupled to switch 202 through any one or more of a wired and a wireless medium. Although not shown, at least some of the access points in any one of the networking domains 214, 234 may be coupled to each other. Notwithstanding, a plurality of actual and/or virtual channels may be provided to facilitate communication with the access points and switches. Although the networking domains 214 and 234 are illustrated as separate networking entities, the invention is not so limited. Accordingly, the networking domain 214, 234 may be part of a single networking entity, but may represent separate security domains within the single networking entity.

In operation, any one or more of the access devices in a domain may reserve bandwidth in its associated domain. For example, any one or more if access devices 216a, 216b, 216c in networking domain 214 may be adapted to reserve bandwidth with any one or more of access points 204, 206, 208, 210, 212. Similarly, any one or more if access devices 216a, 216b, 216c in networking domain 234 may be adapted to reserve bandwidth with any one or more of access points 224, 226, 228, 230, 232. In another aspect of the invention, any one or more of the access points may reserve bandwidth with one or more switches in it associated domain. For example, any one of access points 204, 206, 208, 210, 212 in networking domain 214 may reserve bandwidth with switch 202. Similarly, any one of access points 224, 226, 228, 230, 232 in networking domain 234 may reserve bandwidth with switch 222. In yet another embodiment of the invention, any access device in networking domain 214 may be permitted to reserve bandwidth with any access point or switch in networking domain 234. Similarly, any access device in networking domain 234 may be permitted to reserve bandwidth with any access point or switch in networking domain 214.

In operation, any one or more of the access points in any one or more of the networking domains may be adapted to acquire various bandwidth related information and parameters and communicate the bandwidth related information to one or more of the switches 202, 222. In one embodiment of the invention, for example, access point 206 may be adapted to acquire various bandwidth related information and communicate the acquired information back to the switch 202. Similarly, any one or more of access points 204, 208, 210, 214 may acquire various bandwidth related information and parameters and communicate the acquired information to the switch 202. Similarly, any one or more of access points 224, 226, 228, 230, 232 may acquire various bandwidth related information and parameters and communicate the acquired information to the switch 222.

In addition, this application makes reference to U.S. patent application Ser. No. 10/658,725, entitled "Method and System for Providing and Intelligent Switch for Bandwidth Management in a Hybrid Wired/Wireless Local Area Network" filed on Sep. 9, 2003. The complete subject matter of the above-identified applications are hereby incorporated herein by reference in their entirety.

Figure 3:
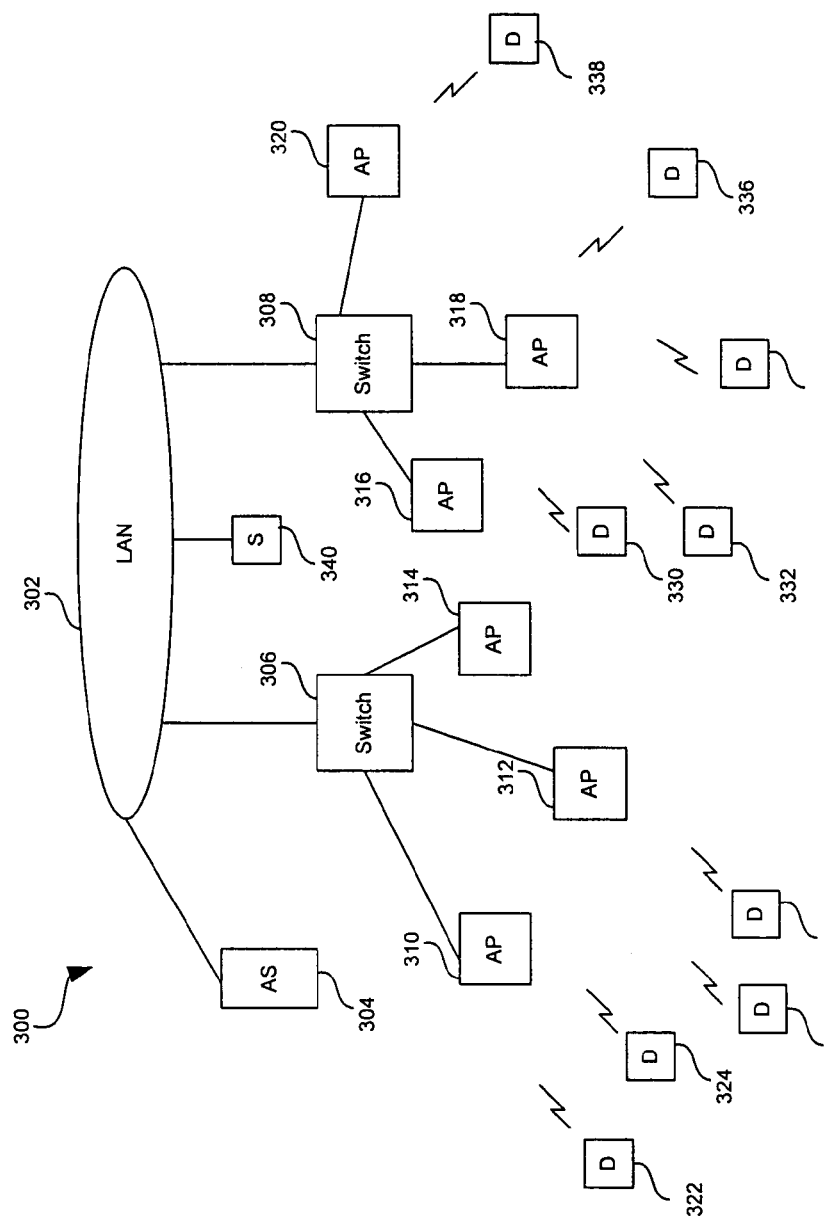
FIG. 3 is a block diagram 300 of an exemplary Enterprise Wireless LAN having switches serving as the edge managers in accordance with an embodiment of the invention.

FIG. 3 is a block diagram 300 of an exemplary Enterprise Wireless LAN having switches serving as the edge managers in accordance with an embodiment of the invention. Referring to FIG. 3, there is shown, a local area network (LAN) 302, authentication server 304, server 340, switches 306, 308, access points (APs) 310, 312, 314, 316, 318, 320 and access devices 322, 324, 326, 328, 330, 332, 334, 336, 338. It should be recognized that the invention is not limited to an Enterprise WLAN. The invention may be applicable to a wired LAN, a wireless LAN and any combination thereof.

Wireless transmission or communication between the access devices or clients, and the access points may be secure. This may be also be true for the wired connections between any of the access points 310, 312, 314, 316, 318, 320 and the switches 306, 308. The switches 306, 308 and access points 310, 312, 314, 316, 318, 320 may be adapted to communicate using, for example, an Ethernet protocol. From the switch's perspective, the switch may be switching regular layer 2 frames. However, within the switch, knowledge of a WLAN and its management intelligence may reside primarily in software. Notwithstanding, the invention is not limited in this regard.

In addition, this application makes reference to U.S. patent application Ser. No. 10/658,161, entitled "Method and System for Providing a Super Channel in a Multi-Band, Multi-Protocol Hybrid Wired/Wireless Network" filed on Sep. 9, 2003. The complete subject matter of the above-identified applications are hereby incorporated herein by reference in their entirety.

Figure 4:
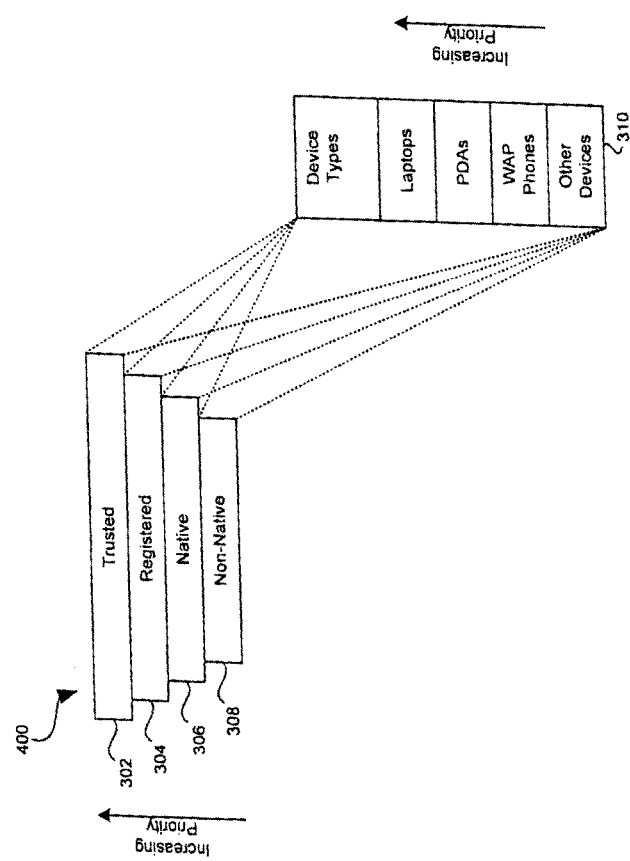
FIG. 4 is a bock diagram of an exemplary hierarchy that may be utilized for bandwidth reservation, sharing and allocation in accordance with an embodiment of the invention.

In one embodiment of the invention, bandwidth sharing and allocation may be dependent on, for example, whether a particular device is native to a network, the identity of the device and or a device user, and a device type. FIG. 4 is a block diagram 400 of an exemplary hierarchy that may be utilized for bandwidth reservation, sharing and allocation in accordance with an embodiment of the invention. Referring to FIG. 4, there is shown a first tier having a trusted client level 402, a registered client level 404, a native client level 406, and a non-native client level 408. A second tier 410 having a hierarchy dependent on a device type is also illustrated.

The trusted client level 402 may include all those access device or clients that that may have properly authenticated certificates for communication. The registered client level 404 may include those access devices that are registered and known to the system. The native client level 406 may include those devices that may be known and which may not have been registered. This may also include devices using the same protocols. The non-native client level 408 may include devices other then those on native client level 406. Among the first tier, trusted client level 404, may have the highest priority while non-native client level 408 may have the lowest priority. In the second tier, within the device type hierarchy, laptops may have the highest priority while devices other than shown may have the lowest priority. The second tier may exist within each of the levels of the first tier. In this regard, a trusted laptop may have highest priority, while a non-native other device may have lowest priority. Notwithstanding, FIG. 4 is provided as an illustration and the invention is not limited in this regard.

In another aspect of the invention, a time division multiplexing (TDM) scheme may be adapted to provide bandwidth sharing in order to minimize channel and noise interference. In this regard, access devices may be given specified instances of time or intervals of time in which they may have a capability to transmit and/or receive information. Accordingly, an access device may be adapted to negotiate with an access point and an access device may be adapted to negotiate with a switch in order to acquire sufficient bandwidth for usage. Similarly, an access point may be adapted to negotiate with a switch to acquire sufficient bandwidth for communication. In another aspect of the invention, the usage of bandwidth may be policed to ensure that a device allocated to a specified bandwidth utilizes only that which is allocated. In case additional bandwidth is required, a new request to reserve additional bandwidth may be initiated. Accordingly, in certain instances, a device or entity may be forced to keep its requested bandwidth.

In yet another embodiment of the invention, a non-native transceiver device may be embedded in a native device to minimize noise and interference in accordance with an aspect of the invention. For example, a Bluetooth transceiver device may be embedded into any one or more of an 802.11a, 802.11b, 802.11g. In operation, in an 802.11 native environment, the non-native Bluetooth device may be adapted to transmit to other Bluetooth devices instructing them the minimize interference on the channel. In this regard, the Bluetooth device may instruct other Bluetooth devices to lower their transmit power, switch to other frequencies or enter a stand by mode for a specified period of time.

In accordance with various embodiments of the invention, dependent on the modulation scheme utilized, one or more of the PLOP frames illustrated in FIG. 1b, FIG. 1c, FIG. 1d and FIG. 1e may be adapted to contain information which may be utilized for providing bandwidth reservation and allocation for access points and/or access devices. This information may be utilized by the switch, access points and/or access devices to provide optimal bandwidth sharing and utilization. Additionally, the PLOP frames may be adapted to convey information for any one or more of, for example, the 801.11a, 802.11b and 802.11g modes of operation utilized by access points and/or access devices in accordance with embodiments of the invention.

Figure 5:
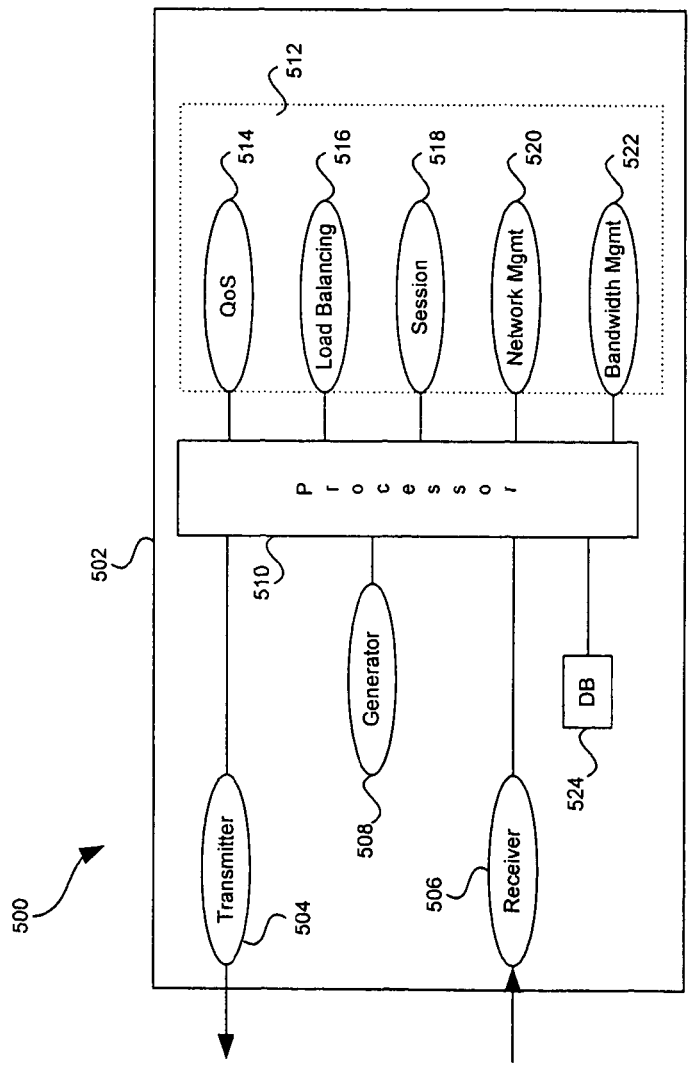
FIG. 5 is a block diagram of an exemplary system for bandwidth allocation and sharing in accordance with an embodiment of the invention.

FIG. 5 is a block diagram 500 of an exemplary system for bandwidth allocation and sharing in accordance with an embodiment of the invention. Referring to FIG. 5, system 502 may include a processor or control processor 510, transmitter 504, receiver 506, generator 508 and controller 512. The controller 512 may include QoS controller 514, bandwidth controller 522, load balancing controller 516, session controller 518 and network management controller 520. The transmitter 504, receiver 506, generator 508 and the components of the controller 512, namely QoS controller 514, load balancing controller 516, session controller 518 and network management controller 520, may be variously coupled to control processor 510. The control processor 510 may be a part of server 340 (FIG. 3), switch 306, 308 and/or an access point such as access points 310, 312, 318, 320.

The components of system 502 may include suitable circuitry and/or software capable of implementing various network management functions, including but not limited to, hardware acceleration, access point aggregation and resiliency, load balancing, QoS management, bandwidth management, session management and control. The task of bandwidth management may include the task of bandwidth allocation and sharing in accordance with an embodiment of the invention. Notwithstanding, although the components of the switch 502 are individually shown, the invention is not limited in this regard. For example, with suitable software and/or logic, the generator function 508 may be implemented solely by the processor 522. Similarly, any one or more of the access point aggregation and resiliency function, bandwidth management function, QoS management function, load balancing function, session management and control function, and network management function, may be integrated and with suitable logic and/or software, may be executed by the control processor 510.

In accordance with an embodiment of the invention, control processor 510 may be adapted to facilitate bandwidth allocation and sharing. Control processor 510, with suitable circuitry and/or software may be adapted to utilize information from transmitter 504, receiver 506, generator 508 and/or controller 512 to facilitate bandwidth allocation and sharing. Additionally, control processor 510 may utilize one or more messaging protocol messages to achieve bandwidth allocation and sharing in accordance with an embodiment of the invention.

In operation, control processor 510 may be adapted to reserve bandwidth for a first access device 328, a first access point 312 and/or a first switch 306. In response to a communication session associated with one or more of the first access device 328, first access point 312 and first switch 306, the control processor 510 may allocate at least a portion of the reserved bandwidth for use by the first access device 328, first access point 312 and/or first switch 306. The control processor 510 may utilize the reserved bandwidth during the communication session. At least an unused remaining portion of the reserved bandwidth may be utilized by the processor for communication by one or more of a second access device 330, a second access point 318 and a second switch 308.

The control processor 510 may be adapted to reserve the bandwidth based on a device type and/or priority associated with a particular access device. Prior to reservation of the bandwidth, the control processor 510 may identify the device type and/or priority of an access device. The control processor may be adapted to receive bandwidth information associated with the first and second access devices 328, 332, the first and second access point, 312, 318, and/or the first and second switches 306, 308 from one or more of a bandwidth management process, a quality of service management process, a load balancing management process, a session control process, and a network management process using, for example, a messaging protocol message. The control processor 510 may utilize the received bandwidth information for bandwidth allocation and sharing.

The control processor 510 may be adapted to send and receive information from one or more of a bandwidth management controller 522, a quality of service controller 512, a load balancing controller 516, a session controller 518 and a network management controller 520. Any one or more of the bandwidth management controller 522, a quality of service controller 512, a load balancing controller 516, a session controller 518 and a network management controller 520, may be adapted to store bandwidth related information in database 524, Accordingly, control processor 510 may be adapted to utilize the information stored in database 524 for bandwidth allocation and sharing. In one aspect of the invention, the functions of one or more of the bandwidth management controller 522, the quality of service controller 512, the load balancing controller 516, the session controller 518 and the network management controller 520 may be integrated within and/or handled by the control processor 510.

In addition, this application makes reference to U.S. patent application Ser. No. 10/658,734, entitled "Method and System for Providing Optimal Load Balancing in a Hybrid Wired/Wireless Local Area Network" filed on Sep. 9, 2003. The complete subject matter of the above-identified applications are hereby incorporated herein by reference in their entirety.

In addition, this application makes reference to U.S. patent application Ser. No. 10/658,514 entitled "Method and System for Network Management in a Hybrid Wired/Wireless Local Area Network" filed on Sep. 9, 2003. The complete subject matter of the above-identified applications are hereby incorporated herein by reference in their entirety.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for managing resources in a hybrid wired/wireless local area network (LAN), the method comprising:
    reserving a bandwidth for a network device, wherein said reserving of said bandwidth is based, at least in part, on a device hierarchy established within the hybrid wired/wireless LAN, wherein said device hierarchy is utilized for one or more of bandwidth reservation, bandwidth sharing, and bandwidth allocation within the hybrid wired/wireless LAN;
    in response to a communication session associated with said network device, allocating at least a portion of said reserved bandwidth for use by said network device;
    utilizing said at least a portion of said reserved bandwidth during said communication session; and
    wherein said allocating comprises allocating at least a portion of said reserved bandwidth and at least an unused remaining portion of said reserved bandwidth upon one or both of an initiation of said communication session or during said communication session.

2. The method according to claim 1, comprising receiving a request for the bandwidth by one or both of said network device or a second network device.

3. The method according to claim 1, wherein said reserving comprises reserving said bandwidth based on a device type of said network device.

4. The method according to claim 3, wherein said reserving comprises reserving said bandwidth based on a priority assigned to said device type.

5. The method according to claim 4, comprising identifying said device type and said priority of said device type prior to said reservation of said bandwidth.

6. The method according to claim 1, comprising receiving bandwidth information associated with said network device from one or more of a bandwidth management process, a quality of service management process, a load balancing management process, a session control process, and a network management process using at least one messaging protocol message, said received bandwidth information utilized for said allocating.

7. A method for managing resources in a hybrid wired/wireless local area network (LAN), the method comprising:
    reserving a bandwidth for a network device, wherein said reserving of said bandwidth is based, at least in part, on a device hierarchy established within the hybrid wired/wireless LAN, wherein said device hierarchy is utilized for one or more of bandwidth reservation, bandwidth sharing, and bandwidth allocation within the hybrid wired/wireless LAN;
    in response to a communication session associated with said network device, allocating at least a portion of said reserved bandwidth for use by said network device:
    utilizing said at least a portion of said reserved bandwidth during said communication session; and
    wherein one of said network device and a second network device utilizes an unused remaining portion of said reserved bandwidth.

8. A non-transitory computer-readable medium, having stored thereon a computer program having at least one code section for managing resources in a hybrid wired/wireless local area network (LAN), the at least one code section being executable by a computer for causing the computer to perform at least the following:
    reserving a bandwidth for a network device, wherein said reserving of said bandwidth is based, at least in part, on a device hierarchy established within the hybrid wired/wireless LAN, wherein said device hierarchy is utilized for one or more of bandwidth reservation, bandwidth sharing, and bandwidth allocation within the hybrid wired/wireless LAN;
    in response to a communication session associated with said network device, allocating at least a portion of said reserved bandwidth for use by said network device;
    utilizing said at least a portion of said reserved bandwidth during said communication session: and
    wherein said allocating comprises allocating at least a portion of said reserved bandwidth and at least an unused remaining portion of said reserved bandwidth upon one or both of an initiation of said communication session or during said communication session.

9. The non-transitory computer-readable medium according to claim 8, wherein the at least one code section comprises code for receiving a request for bandwidth by one or both of said network device or a second network device.

10. The non-transitory computer-readable medium according to claim 8, wherein said reserving comprises reserving said bandwidth based on a device type of said network device.

11. The non-transitory computer-readable medium according to claim 10, wherein said reserving comprises reserving said bandwidth based on a priority assigned to said device type.

12. The non-transitory computer-readable medium according to claim 11, wherein the at least one code section comprises code for identifying said device type and said priority of said device type prior to said reservation of said bandwidth.

13. The non-transitory computer-readable medium according to claim 8, wherein the at least one code section comprises code for receiving bandwidth information associated with said network device from one or more of a bandwidth management process, a quality of service management process, a load balancing management process, a session control process, and a network management process using at least one messaging protocol message, said received bandwidth information utilized for said allocating.

14. A non-transitory computer-readable medium, having stored thereon a computer program having at least one code section for managing resources in a hybrid wired/wireless local area network (LAN), the at least one code section being executable by a computer for causing the computer to perform at least the following:
reserving a bandwidth for a network device, wherein said reserving of said bandwidth is based, at least in part, on a device hierarchy established within the hybrid wired/wireless LAN, wherein said device hierarchy is utilized for one or more of bandwidth reservation, bandwidth sharing, and bandwidth allocation within the hybrid wired/wireless LAN;
in response to a communication session associated with said network device, allocating at least a portion of said reserved bandwidth for use by said network device; and
utilizing said at least a portion of said reserved bandwidth during said communication session; and
wherein one of said network device and a second network device utilizes an unused remaining portion of said reserved bandwidth.

15. A system for managing resources in a hybrid wired/wireless local area network (LAN), the system comprising:
one or more processors, one or more circuits, or a combination thereof for use in a network device, said one or more processors, one or more circuits, or a combination thereof configured to enable reserving a bandwidth for said network device, wherein said reserving of said bandwidth is based, at least in part, on a device hierarchy established within the hybrid wired/wireless LAN, wherein said device hierarchy is utilized for one or more of bandwidth reservation, bandwidth sharing, and bandwidth allocation within the hybrid wired/wireless LAN;
said one or more processors, one or more circuits, or a combination thereof further configured to enable the allocation of at least a portion of said reserved bandwidth for use by said network device in response to a communication session associated with said network device;
said one or more processors, one or more circuits, or a combination thereof further configured to enable the utilization of said at least a portion of said reserved bandwidth during said communication session: and
wherein said allocating comprises allocating at least a portion of said reserved bandwidth and at least an unused remaining portion of said reserved bandwidth upon one or both of an initiation of said communication session and during said communication session.

16. The system according to claim 15, wherein said one or more processors, one or more circuits, or a combination thereof are configured to enable receiving a request for bandwidth by one or both of said network device and a second network device.

17. The system according to claim 15, wherein said reserving comprises reserving said bandwidth based on a device type of said network device.

18. The system according to claim 17, wherein said reserving comprises reserving said bandwidth based on a priority assigned to said device type.

19. The system according to claim 18, wherein said one or more processors, one or more circuits, or a combination thereof are configured to enable identifying said device type and said priority of said device type prior to said reservation of said bandwidth.

20. The system according to claim 15, wherein said one or more processors, one or more circuits, or a combination thereof are configured to enable receiving bandwidth information associated with said network device from one or more of a bandwidth management process, a quality of service management process, a load balancing management process, a session control process, and a network management process using at least one messaging protocol message, said received bandwidth information utilized for said allocating.

21. A system for managing resources in a hybrid wired/wireless local area network (LAN), the system comprising:
one or more processors, one or more circuits, or a combination thereof for use in a network device, said one or more processors, one or more circuits, or a combination thereof configured to enable reserving a bandwidth for said network device, wherein said reserving of said bandwidth is based, at least in part, on a device hierarchy established within the hybrid wired/wireless LAN, wherein said device hierarchy is utilized for one or more of bandwidth reservation, bandwidth sharing, ands bandwidth allocation within the hybrid wired/wireless LAN;
said one or more processors, one or more circuits, or a combination thereof is further configured to enable the allocation of at least a portion of said reserved bandwidth for use by said network device in response to a communication session associated with said network device; and
said one or more processors, one or more circuits, or a combination thereof further configured to enable the utilization of said at least a portion of said reserved bandwidth during said communication session; and
wherein one of said network device and a second network device utilizes an unused remaining portion of said reserved bandwidth.

22. A method for managing resources in a hybrid wired/wireless local area network (LAN), the method comprising:
in response to a communication session associated with a network device, allocating at least a portion of a bandwidth reserved for use by said network device;
utilizing said at least a portion of said bandwidth during said communication session; and
utilizing at least an unused remaining portion of said bandwidth during at least a second communication session.

23. The method according to claim 22, comprising receiving a request for bandwidth by one or both of said network device and a second network device, wherein one or both of said network device and said second network device utilize said unused remaining portion of said bandwidth.

24. The method according to claim 23, comprising receiving a request for bandwidth by one or both of said network device and said second network device.

25. The method according to claim 22, wherein said allocating comprises allocating at least a portion of said bandwidth and said at least said unused remaining portion of said reserved bandwidth upon one or both of an initiation of said communication session and during said communication session.

26. The method according to claim 22, comprises reserving said bandwidth based on a device type of said network device.

27. The method according to claim 26, wherein said reserving comprises reserving said bandwidth based on a priority assigned to said device type.

28. The method according to claim 27, comprising identifying said device type and said priority of said device type prior to said reservation of said bandwidth.

29. The method according to claim 22, comprising receiving bandwidth information associated with said network device from one or more of a bandwidth management process, a quality of service management process, a load balancing management process, a session control process, and a network management process using at least one messaging protocol message, said received bandwidth information utilized for said allocating.

30. A non-transitory computer-readable medium, having stored thereon a computer program having at least one code section for managing resources in a hybrid wired/wireless local area network (LAN), the at least one code section being executable by a computer for causing the computer to perform at least the following:
   in response to a communication session associated with a network device, allocating at least a portion of a bandwidth reserved for use by said network device;
   utilizing said at least a portion of said bandwidth during said communication session; and
   utilizing at least an unused remaining portion of said bandwidth during at least a second communication session.

31. The non-transitory computer-readable medium according to claim 30, wherein the at least one code section comprises code for receiving a request for the bandwidth by one or both of said network device and a second network device, wherein one or both of said network device and said second network device utilize said unused remaining portion of said bandwidth.

32. The non-transitory computer-readable medium according to claim 31, wherein the at least one code section comprises code for receiving a request for bandwidth by one or both of said network device and said second network device.

33. The non-transitory computer-readable medium according to claim 30, wherein said allocating comprises allocating at least a portion of said bandwidth and said at least said unused remaining portion of said reserved bandwidth upon one or both of an initiation of said communication session and during said communication session.

34. The non-transitory computer-readable medium according to claim 30, wherein the at least one code section comprises code for reserving said bandwidth based on a device type of said network device.

35. The non-transitory computer-readable medium according to claim 34, wherein said reserving comprises reserving said bandwidth based on a priority assigned to said device type.

36. The non-transitory computer-readable medium according to claim 35, wherein the at least one code section comprises code for identifying said device type and said priority of said device type prior to said reservation of said bandwidth.

37. The non-transitory computer-readable medium according to claim 30, wherein the at least one code section comprises code for receiving bandwidth information associated with said network device from one or more of a bandwidth management process, a quality of service management process, a load balancing management process, a session control process, and a network management process using at least one messaging protocol message, said received bandwidth information utilized for said allocating.

38. A system for managing resources in a hybrid wired/wireless local area network (LAN), the system comprising:
   one or more processors, one or more circuits, or a combination thereof for use in a network device, wherein said one or more processors, one or more circuits, or a combination thereof are configured to enable allocating at least a portion of a bandwidth reserved for use by said network device, said allocating in response to a communication session associated with said network device;
   wherein said one or more processors, one or more circuits, or a combination thereof are further configured to enable utilizing said portion of said bandwidth during said communication session; and
   wherein said one or more processors, one or more circuits, or a combination thereof are further configured to enable utilizing at least an unused remaining portion of said bandwidth during at least a second communication session.

39. The system according to claim 38, wherein said one or more processors, one or more circuits, or a combination thereof are configured to enable receiving a request for bandwidth by one or both of said network device and a second network device, wherein one or both of said network device and said second network device utilize said unused remaining portion of said bandwidth.

40. The system according to claim 39, wherein said one or more processors, one or more circuits, or a combination thereof are configured to enable receiving said request for bandwidth by one or both of said network device and said second network device.

41. The system according to claim 38, wherein said allocating comprises allocating at least a portion of said bandwidth and said at least said unused remaining portion of said reserved bandwidth upon one or both of an initiation of said communication session and during said communication session.

42. The system according to claim 38, wherein said one or more processors, one or more circuits, or a combination thereof are configured to enable reserving said bandwidth based on a device type of said network device.

43. The system according to claim 42, wherein said reserving comprises reserving said bandwidth based on a priority assigned to said device type.

44. The system according to claim 43, wherein said one or more processors, one or more circuits, or a combination thereof are configured to enable identifying said device type and said priority of said device type prior to said reservation of said bandwidth.

45. The system according to claim 38, wherein said one or more processors, one or more circuits, or a combination thereof are configured to enable receiving bandwidth information associated with said network device from one or more of a bandwidth management process, a quality of service management process, a load balancing management process, a session control process, and a network management process using at least one messaging protocol message, said received bandwidth information utilized for said allocating.

* * * * *